United States Patent [19]

Bogaard

[11] 4,116,117

[45] Sep. 26, 1978

[54] INSTALLATION FOR THERMAL TREATMENT OF CONTAINER-PACKED COMMODITIES

[75] Inventor: Hendricus Johannes Maria Bogaard, Alkmaar, Netherlands

[73] Assignee: Stork Amsterdam B.V., Amstelveen, Netherlands

[21] Appl. No.: 681,257

[22] Filed: Apr. 28, 1976

[30] Foreign Application Priority Data

May 7, 1975 [NL] Netherlands ........................ 7505435

[51] Int. Cl.² ............................................. A23L 3/04
[52] U.S. Cl. ..................................... 99/361; 198/607
[58] Field of Search ................. 99/361, 366, 470, 477, 99/483, 367, 359, 360; 34/189–190; 198/472, 604, 607, 624, 626, 648, 836; 165/65; 21/105, 96, 97

[56] References Cited

U.S. PATENT DOCUMENTS

| 1,123,934 | 1/1915 | Schrafft | 198/607 |
| 1,741,925 | 12/1929 | Enock | 99/361 |
| 2,042,686 | 6/1936 | Stephens | 99/361 |
| 3,418,084 | 12/1968 | Allington | 198/472 |
| 3,927,976 | 12/1975 | Reimers | 99/361 |

FOREIGN PATENT DOCUMENTS 1,157,064 11/1963 Fed. Rep. of Germany ............. 99/361

*Primary Examiner*—Harvey C. Hornsby
*Assistant Examiner*—Robert Pous
*Attorney, Agent, or Firm*—Ostrolenk, Faber, Gerb & Soffen

[57] ABSTRACT

Installation for the pasteurization or sterilization of container-packed commodities such as baby food in glass jars, a plurality of those containers being united in a carrier, a number of carriers being stepwise advanced in vertical direction in a treatment space, several treatment spaces being interconnected by means of a horizontal conveying system comprising a sluice.

5 Claims, 4 Drawing Figures

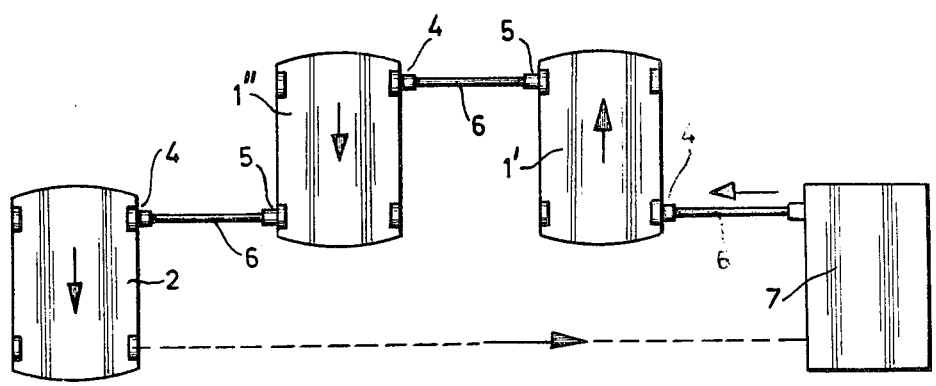
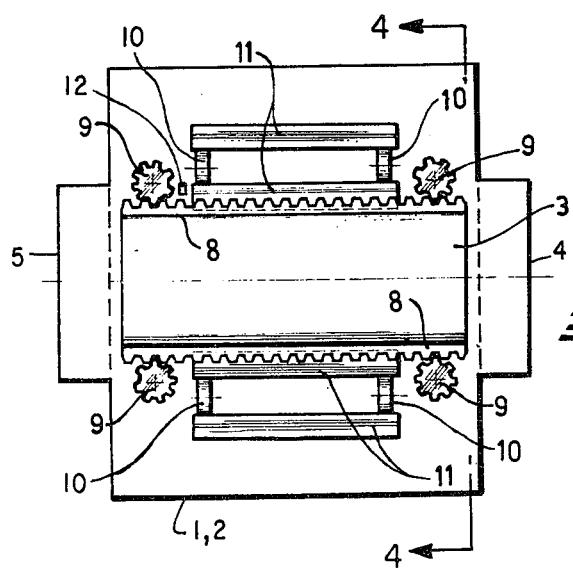

INSTALLATION FOR THERMAL TREATMENT OF CONTAINER-PACKED COMMODITIES

BACKGROUND OF THE INVENTION

My invention relates to an installation for thermal treatment of container-packed commodities, such as foodstuffs or medicines, which containers are advanced groupwise in carriers, the installation having a conveying system for these carriers, at least one treatment space with an inlet and an outlet, and internal means for moving the carriers stepwise in a vertical direction within this treatment space. Such an installation is known per se in various embodiments; the treatment path therein extends substantially in a horizontal direction owing to which the apparatus gets considerable dimensions. Moreover notable forces are required for periodically displacing the carriers as the driving means should simultaneously push a plurality of carriers over a rather substantial horizontal distance.

SUMMARY OF THE INVENTION

My invention aims to provide an installation of a rather simple construction which can be manufactured therefore at a low price and which at the same time offers the possibility of a most extensive range of treatments adapted to the nature of the products to be treated. To this end the installation comprises at least two treatment spaces which are each connected to the conveying system via at least one sluice in which each treatment space allows only a vertical displacement of the carriers, except for the level at which the inlet and outlet of the carriers are effected. Owing hereto it is possible to operate with one or more small units (treatment spaces) which are interconnected via horizontal path portions along which the carriers are displaced by means allowing an individual drive of each carrier.

It is a further object of my invention to avoid a jamming of the carriers during a horizontal conveyance by providing a rack on either side of each carrier, parallel to the underside of the carrier, and at least two driven pinions, cooperating with each rack. A still further object of my invention consists in giving the racks a function both for the displacement and for the locking of the carriers.

SURVEY OF THE DRAWINGS

FIG. 2 is a diagrammatic view of an installation having three treatment spaces;

FIG. 3 is on a larger scale a section through a treatment space in which the conveying system is shown.

DESCRIPTION OF A PREFERRED EMBODIMENT

Figure 1:
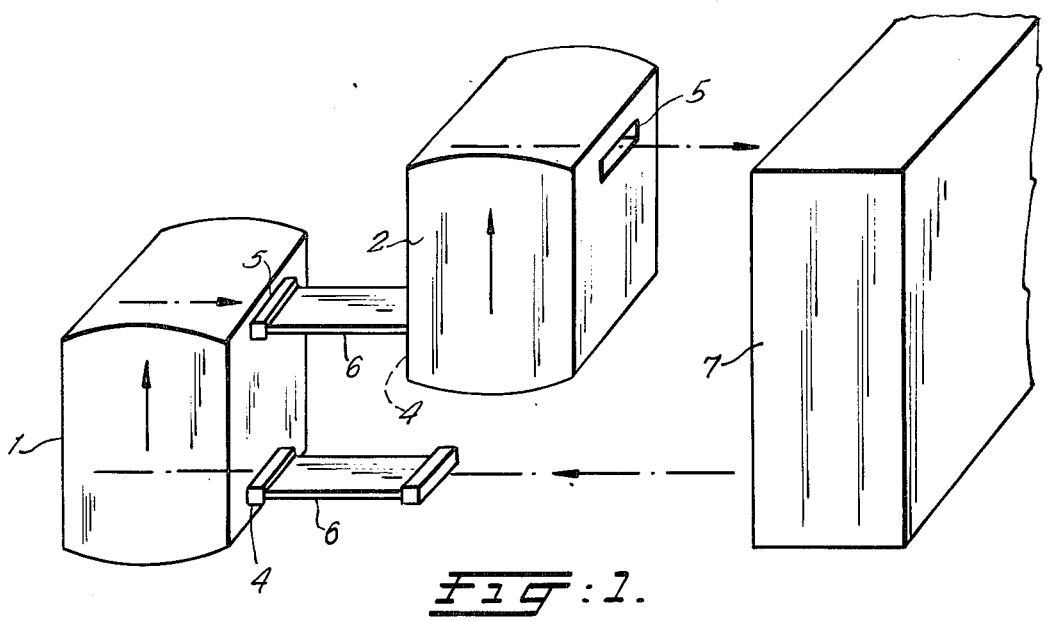
FIG. 1 shows an installation with two treatment spaces.

The simplest embodiment of the installation comprises a treatment space 1, in which the thermal treatment proper is performed, and a treatment space 2 for cooling the treated articles again. Said articles consist of containers, for instance cans, glass jars or so-called pouches packed with foodstuffs or medicaments. These containers are conveyed groupwise that is to say simultaneously in large numbers in carriers 3 (see FIGS. 3 and 4) consisting of flat boxes or gratings. Each treatment space 1, 2 is provided with an inlet 4 and an outlet 5 connected to a conveying system for the carriers 3. The supply to and the discharge from the treatment space 1 of the carriers 3 is effected via a sluice 6 which makes it possible to maintain a pressure within the treatment space 1 which differs from the ambient atmosphere. Said pressure within the space 1 will generally be higher than the atmospheric pressure, in order to accelerate the thermal treatment within the space 1. The thermal treatment can be carried out in any desired manner for instance in a liquid bath, by spraying or by a combination of the two. In the treatment space 2 the carriers 3 with the containers bearing therein are cooled and finally discharged towards a device 7 for vertical conveyance. By means of this device 7 the carriers 3 can continuously circulate through the installation.

Figure 4:
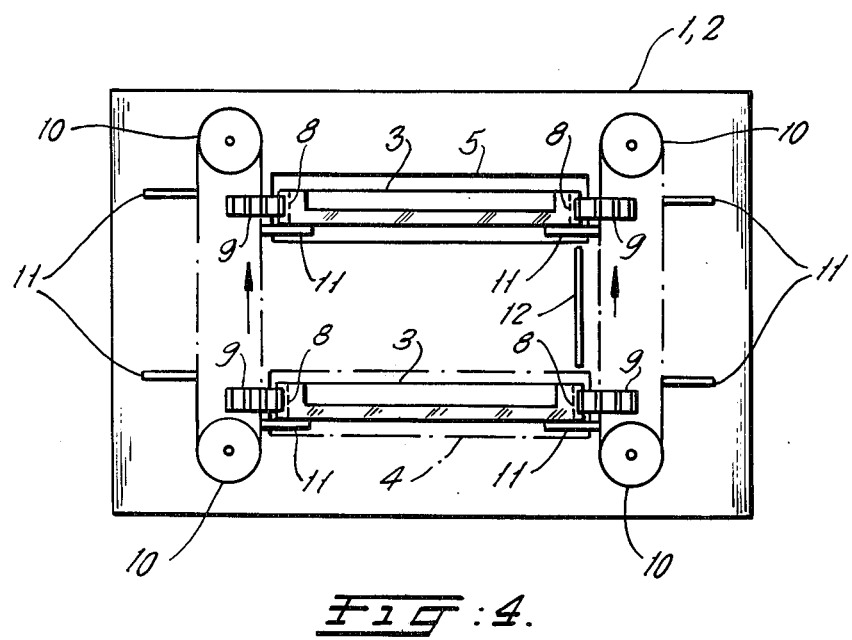
FIG. 4 is a cross section of FIG. 3 taken along line 4—4.

Each treatment space 1, 2 only offers room for a vertical movement of the carriers 3 as is best seen in FIGS. 3 and 4. Horizontal movement is only possible at the level of the inlet 4 and the outlet 5. The members for horizontally displacing each carrier 3 consist of a rack 8 disposed on either side of the carrier, parallel to the underside thereof, and of at least two pinions 9, having a drive (not shown), cooperating with each rack 8. The same pinions are present within the sluices 6 for taking over the drive and passing the carriers 3 from one space to the other.

The vertical conveying means within each treatment space 1, 2 consist of a pair of endless chains 10 on either side of the carriers 3. These chains are provided with a horizontal supporting strip 11 having a length shorter than that of the carriers. In this manner the pinions 9 within the treatment space may be located at the level of the inlet and outlet and be situated beyond the ends of the supporting strips 11.

A vertical rod 12 is positioned within the treatment space 1, 2 and between the level of the inlet and the outlet. This rod engages a rack of each carrier 3 thus locking these carriers in a horizontal direction. In this manner it is ensured that at the end of the vertical conveyance of each carrier within the space 1, 2, the racks 8 of each carrier 3 engages the pinions 9 at the location of the outlet 5. In the installation according to FIG. 1 the direction of conveyance is shown going from below to upwards in the spaces 1 and 2. The device 7 ensures the return of the carriers from the upper level down to the starting level. At the location which is not shown, the treated containers will be discharged from the consecutive carriers whereupon a group of fresh containers is slid into the empty carrier. The carrier loaded in this manner can be conveyed to the sluice 6 at the lower end of the treatment space 1.

It should be noted that the time of the effective stroke of the members 9 for horizontal displacement is at most equal to, but off-set with respect to, the time duration of each step of the vertical displacement means 10, 11. It should further be noted that the vertical displacement means may be considered to be a modification of the means described in U.S. Pat. No. 3,864,846.

In the embodiment according to FIG. 2 the treatment space 1 consists of two parts denoted by 1' and 1". This allows to step up the treatment pressure and possibly the temperature in two stages. Due to this duplication it is also possible to double the treatment time without the height of the treatment space becoming too extensive. Each carrier may be provided with jockey wheels (not shown) bearing within the treatment space on the supporting strips 11 and cooperating outside the treatment space with rails (not shown) within the sluices 6 and in the other portions of the path of the horizontal conveying system. The latter fact may lead to a considerable decrease of the driving energy required for this conveying system.

The advantages of the installation according to my invention are that the construction is compact and simple, due to the subdivision of the treatment to be carried out into two or more treatment spaces. The installation can furthermore be adapted in a rather simple manner to the special requirements for treating particular products.

What is claimed is:

1. An installation for thermal treatment of container packed commodities, such as foodstuffs or medicines, comprising:
    (A) a plurality of carriers, each for carrying a respective group of containers;
    (B) at least two treatment spaces, each having a vertical orientation and having vertical ends, with an inlet at one said vertical end of each said treatment space, and an outlet at the opposite said vertical end of each said treatment space; between a said treatment space inlet and outlet, said treatment space having a height greater than a stack of carriers containing containers;
    (C) means for heating the interior of at least one of said treatment spaces;
    (D) vertical moving means in each said treatment space for engaging a said carrier in said treatment space at the vertical level of said inlet thereof and for transmitting that said carrier vertically in said treatment space to the vertical level of said outlet therefrom;
    (E) horizontal displacement locking means in each said tratment space for blocking horizontal displacement of said carriers during the vertical displacement thereof from said treatment space inlet to said treatment space outlet; each of said horizontal displacement locking means comprising a vertically extending rod in said treatment space and being of a length and being so located as to be between the levels of said inlet and said outlet of said treatment space and being positioned in said treatment space to engage said rack of each said carrier moving vertically through said treatment space for locking said carrier against moving horizontally as it moves vertically past said rod;
    (F) horizontal displacement sluice means connected to said treatment space inlets and to said outlet of one of said at least two treatment spaces, thereby joining said outlet of one said treatment space to said inlet of the other said treatment space; and
    (G) horizontal moving members for transmitting said carriers horizontally over said sluice means, said horizontal moving members comprising:
        (1) a rack on each said carrier and oriented thereon to extend along the direction of horizontal movement thereof;
        (2) rotatable pinion means in each said treatment space and located at the vertical levels of said treatment space at said inlet and said outlet thereof, and positioned and adapted to engage a set rack when the respective said carrier is at said inlet and at said outlet of the respective said treatment space, such that rotation of said pinion means in engagement with said rack moves the respective said carrier into said inlet of said treatment space and out of said outlet of said treatment space.

2. Installation according to claim 1, wherein said vertical moving means comprise endless chain means extending vertically through said treatment space and being vertically movable therethrough; a horizontally oriented supporting strip supported on said chain means and being vertically movable therewith, and being positioned to engage a said carrier that is then at said treatment space inlet, for remaining in engagement with that said carrier to move that said carrier to said treatment space outlet and for then disengaging from that said carrier;

said horizontally oriented suporting strip having a horizontal length that is shorter than the horizontal length of the said carrier; said pinion means being located horizontally beyond the end of said horizontally oriented supporting strip, whereby said pinion means may engage a said rack without interfering with vertical movement of said horizontally oriented supporting strip.

3. Installation according to claim 2, wherein there is a said rack on either side of each said carrier; each said carrier has a horizontally oriented underside and each said rack is parallel to the respective said carrier underside; said pinion means comprising at least two driven pinions positioned to cooperate with each said rack.

4. Installation according to claim 3, wherein said chain means comprises two pair of endless chains, with each pair being placed on the opposite horizontally extending side of each said carrier; each said pair of chains on a said side of a said carrier supporting a respective said horizontal supporting strip; the said pinions on the same said side of said carrier as a respective supporting strip are located beyond the respective opposite ends of that said supporting strip.

5. Installation according to claim 2, wherein said horizontal displacement locking means comprises a vertically extending rod in said treatment space and being of a length and being so located as to be between the levels of said inlet and said outlet of that said treatment space and being positioned in said treatment space to engage said rack of each said carrier moving vertically through said treatment space for locking said carrier against moving horizontally as it moves vertically past said rod.

* * * * *